United States Patent [19]

Greene et al.

[11] Patent Number: 4,787,714
[45] Date of Patent: Nov. 29, 1988

[54] OPTICAL SYSTEM INCLUDING DEVICE FOR OPTICALLY PROCESSING ELECTROMAGNETIC RADIATION AT A REPETITION RATE GREATER THAN ABOUT $1.25 \times 10^4$ HZ

[75] Inventors: Benjamin I. Greene, Westfield; Rebecca R. Millard, New Providence; Joseph Orenstein, Red Bank, all of N.J.; Leah R. Williams, Cambridge, Mass.

[73] Assignee: American Telephone and Telegraph Company, AT&T Bell Laboratories, Murray Hill, N.J.

[21] Appl. No.: 875,268

[22] Filed: Jun. 17, 1986

[51] Int. Cl.$^4$ .......................... G02B 5/23; G02B 6/10; G02F 1/01; H01S 3/10
[52] U.S. Cl. ................................ 350/354; 350/96.13; 372/21; 455/611; 370/1
[58] Field of Search ................. 350/354, 96.13; 332/7.51; 370/1; 372/21; 455/611

[56] References Cited

U.S. PATENT DOCUMENTS

| 4,209,690 | 6/1980 | Rentzepis | 332/7.51 |
| 4,515,429 | 5/1985 | Smith et al. | 350/96.13 |
| 4,630,898 | 12/1986 | Jewell | 350/354 |

OTHER PUBLICATIONS

Smith et al., "Bistable Optical Devices Promise Subpicosecond Switching", IEEE Spectrum, 6–1981, pp. 26–31.
Rushford et al., "Observation of Thermal Optical Bistability, Crosstalk, Regenerative Pulsations, and External Switch-Off in a Simple Dye-Filled Etalon", Optical Bistability 2, 1984 (from Optical Bistability, Jun. 15–17, 1983), pp. 345–352.
Carter et al., "Time and Wavelength Resolved Nonlinear Optical Spectroscopy of a Polydiacetylene in the Solid State Using Picosecond Dye Laser Pulses", Applied Physic Letters, vol. 47, No. 5, Sep. 1, 1985, pp. 457–459.

Primary Examiner—Eugene R. Laroche
Assistant Examiner—Michael Shingleton
Attorney, Agent, or Firm—Bernard Tiegerman

[57] ABSTRACT

An optical system is disclosed which includes at least a first source of electromagnetic radiation (signal beam radiation), a device for processing the signal beam radiation, and a detector for detecting the processed signal beam radiation. The processing device functions, for example, as an amplitude modulator, a demultiplexer, or a switch, and includes a material region exhibiting a nonlinear optical response at one or more resonant wavelengths of electromagnetic radiation, as well as at least a second source of electromagnetic radiation (control beam radiation) for selectively inducing the nonlinear optical response. Significantly, the wavelength, duration and intensity of the control beam radiation are chosen to induce a resonant, nonlinear optical response, essentially free of any relatively slow component, in said material region at repetition rates higher than about $1.25 \times 10^4$ Hz, or higher than about $3.3 \times 10^{10}$ Hz, or even as high, or higher, than about $2.5 \times 10^{11}$ Hz.

7 Claims, 6 Drawing Sheets

OPTICAL SYSTEM INCLUDING DEVICE FOR OPTICALLY PROCESSING ELECTROMAGNETIC RADIATION AT A REPETITION RATE GREATER THAN ABOUT $1.25 \times 10^4$ HZ

BACKGROUND OF THE INVENTION

1. Field of the Invention

The invention pertains generally to optical systems, e.g., optical communication systems and optical computers.

2. Art Background

Optical systems, e.g., optical communication systems and optical computers, are in use, or are being developed, because such systems are capable, or offer the possibility, of transmitting and/or processing much larger amounts of information, much more quickly, than is possible using purely electronic systems.

The optical systems, referred to above, typically include one or more sources of electromagnetic radiation, e.g., one or more semiconductor lasers, a device (or devices) for processing the electromagnetic radiation emitted by sources, and one or more detectors for detecting the processed electromagnetic radiation. The electromagnetic radiation emitted by the sources is communicated to the processing device (or devices), and then to the detectors through, for example, the air, a vacuum, or through waveguides such as optical fibers.

The processing devices employed in the optical systems include, for example, switches (devices for switching electromagnetic radiation from one waveguide to another waveguide of the system), amplitude modulators (devices for altering the intensity of the electromagnetic radiation), and multiplexers/demultiplexers (devices which serve, for example, to redirect the electromagnetic radiation carried by a plurality of waveguides onto a single waveguide and vice versa). At present, these devices are typically fabricated in electrooptic materials, such as lithium niobate, and the processing is performed electronically. For example, a switch, containing two or more planar waveguides (typically in optical communication with other waveguides, e.g., optical fibers, of the system) is formed in a lithium niobate substrate by depositing a dopant, such as titanium, onto the surface of the substrate in the pattern desired for the planar waveguides. The substrate is then heated to diffuse the dopant into the substrate, thus forming the planar waveguides. In addition, electrodes are formed on opposite sides of one or more of the planar waveguides. To produce switching, a voltage is applied across the electrodes, thus inducing a local change in the optical polarizability of the lithium niobate, which locally changes the refractive index and, in turn, alters the path of light from one planar waveguide to the other planar waveguide. Significantly, switching speed depends upon the configuration of the electrodes. For example, when applying a voltage to electrodes having a lumped electrode configuration, the time required to achieve switching is limited by the RC time constant of the electrodes, which is typically several nanoseconds (ns). (Removing the applied voltage results in the induced changes in optical polarizability and refractive index disappearing essentially instantaneously.) As a consequence, the cycle time (the time interval between successive switching operations) is limited to (is no smaller than) several nanoseconds (ns), and thus the repetition rate (the number of switching operations per unit time, equal to the inverse of the cycle time) is limited to no omre than about $3 \times 10^8$ Hertz(Hz). On the other hand, when using a traveling wave (transmission line) electrode configuration, a switching time, and a cycle time, equal to several hundreds of picoseconds (ps) is readily achieved, yielding a repetition rate as high as $3 \times 10^9$ Hz.

To achieve even shorter cycle times and higher repetition rates, devices have been sought, and proposed, in which the processing is achieved by purely optical means. That is, these proposed devices typically include a region of material which serves as a transmission medium for a beam of electromagnetic radiation (hereafter the signal beam) to be processed. Significantly, the transmission medium is chosen to exhibit a nonlinear optical response (a change in refractive index and/or optical absorption) when impinged by a second beam of electromagnetic radiation (hereafter the control beam), with the nonlinear optical response serving to effect the processing of the signal beam.

One device which is exemplary of the devices employing purely optical processing is disclosed in J. L. Jewell et al., "Parallel Operation and Crosstalk Measurements in GaAs Etalon Optical Logic Devices," *Applied Physics Letters*, Vol. 48, No. 20, May 19, 1986, pp. 1342–1344. This device is a gallium arsenide (GaAs) etalon which includes a layer of GaAs (an inorganic semiconductor material), having a thickness less than about 1 micrometer ($\mu$m), sandwiched between two dielectric mirrors. The mirrors are designed to exhibit relatively high reflectivity to electromagnetic radiation having a wavelength of about 890 nanometers (nm), and relatively low reflectivity to electromagnetic radiation having a wavelength of about 800 nm. Moreover, the etalon is designed so that a peak in the transmission curve of the etalon occurs at the former wavelength. In operation, and in the absence of a control beam, a signal beam, having a wavelength of 890 nm, impinging upon the GaAs, suffers relatively little absorption, and is thus largely transmitted. On the other hand, by impinging a control beam, having a wavelength of 800 nm, upon the GaAs, valence band electrons in the GaAs are promoted into the conduction band, which alters the refractive index of the GaAs and, as a consequence (essentially instantaneously) shifts the etalon transmission peak away from 890 nm. As a result, the signal beam (having a wavelength of 890 nm) suffers relatively low transmission. Depending upon the thickness of the GaAs, this decrease in etalon transmission exhibits a characteristic decay time, $\tau$ (the time interval over which the decrease in transmission decays to 1/e of its original value, after the control beam is turned off), ranging from about 200 ps to about 15 ps. Significantly, it is this decay time which limits device speed. That is, the control beam cannot be turned on a second time to produce a significantly decreased etalon transmission until the first transmission decrease has largely disappeared, which typically takes about $2\tau$. Thus, and depending upon the thickness of the GaAs, the cycle time of this device (the time interval between successive, low transmission states) ranges from about 400 ps to about 30 ps, and therefore the repetition rate ranges from about $2.5 \times 10^9$ Hz to about $3.3 \times 10^{10}$ Hz.

Figure 1:
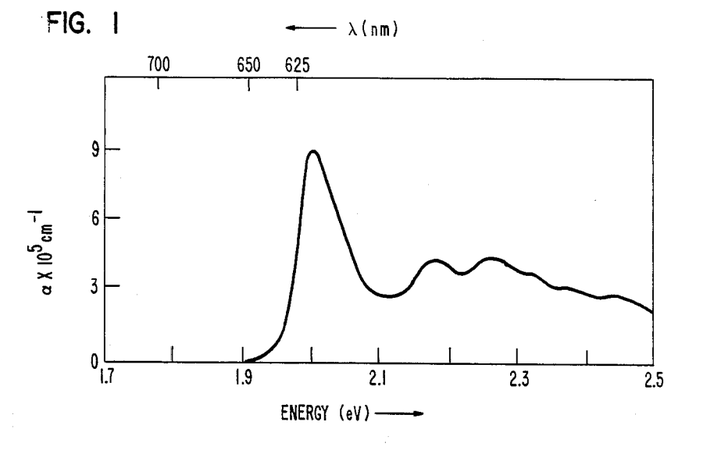
FIG. 1 is a graph of absorption coefficient, $\alpha$, as a function of photon energy and wavelength, $\lambda$, for PDA-PTS.

Rather than employing inorganic semiconductor materials, such as GaAs, processing devices have also been proposed which employ organic materials, such as polydiacetylene (PDA). In this regard, it is known that one particular crystalline form of PDA, known as poly- 2,4-hexadiyn-1,6-diol bis (p-toluene sulfonate) (PDA-PTS), exhibits the absorption spectrum depicted in FIG. 1, which includes a wavelength region of relatively high absorption (a region where the absorption coefficient, $\alpha$, is greater than or equal to about $2\times10^4$ cm$^{-1}$), extending from about 640 nm to shorter wavelengths. It is also known that this relatively high absorption region is associated with electrons being promoted from a relatively low energy electronic state (the ground state) to a higher energy electronic state as a result of photon absorption. Significantly, it has long been known that PDA exhibits a relatively large (compared to that in other materials) nonlinear optical response at wavelengths associated with relatively low absorption, i.e., wavelengths at which $\alpha$ is less than about $2\times10^4$ cm$^{-1}$. This response is believed to decay essentially instantaneously, i.e., within $10^{-15}$ seconds. Unfortunately, the magnitude of this response (though relatively large compared to that in other materials) is generally too small to be useful for device applications. On the other hand, if has long been believed that the (much larger) nonlinear optical response at wavelengths exhibiting relatively high absorption ($\alpha \geq 2\times10^4$ cm$^{-1}$) would have a much longer decay time.

An experimental investigation into the decay times associated with the nonlinear optical responses produced in PDA-PTS at wavelengths ranging from about 651.5 nm (which is at the long-wavelength edge of the relatively high absorption region extending from about 640 nm to shorter wavelengths) to about 701.5 nm has been carried out and is described in G. M. Carter et al, "Time and Wavelength Resolved Nonlinear Optical Spectroscopy of a Polydiacetylene in the Solid State Using Picosecond Dye Laser Pulses", *Applied Physics Letters*, Vol. 47, No. 5 (Sept. 1, 1985), pp. 457–459. This investigation involved the use of conventional, degenerate four-wave mixing. That is, two pulses of electromagnetic radiation, of identical wavelength, were interfered within a volume region of the PDA-PTS to produce a periodic intensity variation which resulted in a periodic variation in refractive index (the nonlinear optical response) and thus, in effect, a volume diffraction grating. These pulses had durations of about 6 ps and had peak intensities of about $2.5\times10^7$ watts per square centimeter (W/cm$^2$). A third pulse of electromagnetic radiation, of identical wavelength, duration and intensity was impinged upon the PDA-PTS and diffracted by the diffraction grating to produce a fourth beam of electromagnetic radiation which traversed the thickness of PDA-PTS and was then detected by a detector. By varying the arrival time of the third pulse relative to the first two pulses, it was determined that the duration of the nonlinear optical response at the edge of the PDA-PTS relatively high absorption region was less than the pulse duration, and thus less than about 6 ps. Based upon this experimental data, and by making a number of (implicit) assumptions, it was then inferred that the nonlinear optical response at relatively high absorption wavelengths, e.g., at 625 nm would also have a decay time less than about 6 ps. One of the (implicit) assumptions underlying this conclusion is that the absorption in PDA-PTS is attributable to the existence of only a single electronic excited state, and it was this state that was accessed (populated) by the two interfering pulses.

To date, there has been no reported experimental verification that PDA truly exhibits a nonlinear optical response at relatively high absorption wavelengths having a decay time less than about 6 ps. In the absence of such verification, the utility of PDA in fast optical processing devices is still in question.

Thus, those engaged in the development of optical processing devices have sought, and continue to seek, fast devices capable of achieving relatively high repetition rates.

SUMMARY OF THE INVENTION

The invention involves the finding that a plurality of states are readily populated in materials, e.g., organic materials such as PDA, via resonant optical (control beam) excitations, i.e., optical excitations at wavelengths where $\alpha$ is greater than or equal to about $2\times10^4$ cm$^{-1}$, and that these states include both relatively short-lived and relatively long-lived states. Moreover, the wavelength, duration and intensity of the control beam radiation determine which state or states are accessed. For example, in the case of PDA-PTS, it has been found that only a first electronic energy level (herein denoted $S_1$), having a decay time of about 2 ps, is populated provided the incident control beam is in the form of a pulse having a wavelength of about 625 nm, a duration of about 2 ps or longer (full-width-at-half maximum), and an intensity (the ratio of pulse energy to pulse width, per unit area) equal to or less than about $4\times10^6$ W/cm$^2$. If the corresponding nonlinear optical response is to have a decay time equal to that of $S_1$, then the duration of the control beam pulse should be less than or equal to 2 ps (to avoid repopulating $S_1$, and thus producing a longer nonlinear optical response). As a consequence, a cycle time (in the nonlinear optical response) as small as about 4 ps (twice the decay time of the nonlinear optical response), and a corresponding repetition rate as high as about $2.5\times10^{11}$ Hz, is readily achieved.

By contrast, it has also been found that a control beam pulse of wavelength equal to 625 nm, duration equal to or greater than about 2 ps, and intensity greater than about $4\times10^6$ W/cm$^2$ results in the population of a triplet state (herein denoted $T_1$), as well as $S_1$. Significantly, this triplet state exhibits a decay time equal to about forty microseconds ($\mu$s). Thus, if a control beam pulse (of wavelength equal 625 nm) had a duration of, for example, 2 ps, and the intensity of the control beam were equal to to $2.5\times10^7$ W/cm$^2$ (the intensity employed in Carter et al), then the resulting nonlinear optical response would contain both a component exhibiting a 2 ps decay time as well as a component exhibiting a decay time equal to about 40 $\mu$s. Successive repetitions of such control beam pulses, separated by time intervals less than about 40 $\mu$s, would necessarily result in an ever-increasing population in $T_1$ (until a steady-state population is established), which would be manifested by a corresponding nonlinear optical response, i.e., the response would include (a relatively slow) component exhibiting a decay time equal to about 40 $\mu$s. As a result, at cycle times less than about 40 $\mu$s, and thus repetition rates greater than about $1.25\times10^4$ Hz, the form of the nonlinear optical response would be dependent upon the repetition rate, i.e., the relative amplitude of the relatively slow component would increase with increasing repetition rate.

It has further been found that even at relatively low intensities, the use of relatively short wavelength (high frequency) control beam radiation, e.g., control beam radiation of wavelength equal to 488 nm, also results in the population of $T_1$ in PDA-PTS, and thus results in the relatively slow, nonlinear optical responses discussed above.

BRIEF DESCRIPTION OF THE DRAWINGS

The invention is described with reference to the accompanying drawings, wherein.

DETAILED DESCRIPTION

The invention involves an optical system, e.g., an optical communication system or an optical computer, which includes one or more optical processing devices, at least one of these devices employing, at least in part, purely optical processing. Significantly, this device includes a material, e.g., an organic material, exhibiting a nonlinear optical response at one or more resonant wavelengths. In addition, the device includes at least one source of electromagnetic radiation which emits a control beam whose wavelength, duration and intensity are chosen to produce a resonant, nonlinear optical response within the material of sufficiently short duration so as to be essentially free of any relatively slow component even at repetition rates higher than about $1.25 \times 10^4$ Hz (i.e., at repetition rates which yield relatively slow components when using the durations and intensities taught in Carter et al.), or higher than about $3.3 \times 10^{10}$ Hz (higher than is achievable with the GaAs etalon), or even as high as about $2.5 \times 10^{11}$ Hz (readily achieved in PDA, provided the appropriate wavelength, duration and intensity is employed).

Figure 2:
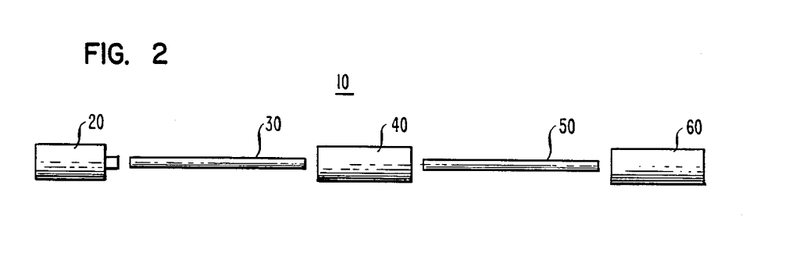
FIG. 2 depicts the inventive optical system.

With reference to FIG. 2, the inventive optical system 10 includes at least one source 20 of (signal) electromagnetic radiation, e.g., at least one semiconductor laser, which is in optical communication with one or more devices which process the (signal) electromagnetic radiation emitted by the source (or sources) 20. At least one of these processing devices is a processing device 40 which employs (at least in part) purely optical processing. The system 10 also includes at least one detector 60 of electromagnetic radiation, in optical communication with the processing device 40. In one embodiment of the invention, the source 20 communicates with the processing device 40, which in turn communicates with the detector 60, through waveguides 30 and 50, such as optical fibers (as shown in FIG. 2). Alternatively, the optical communication is achieved by transmitting the unprocessed and processed electromagnetic radiation through, for example, the air or a vacuum.

Figure 3:
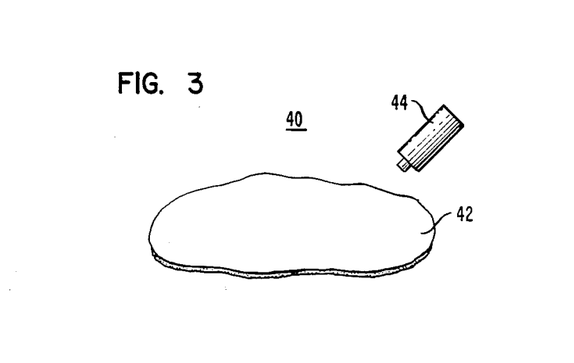
FIGS. 3 and 5-9 depict embodiments of the inventive optical processing device.

In accordance with the invention, the processing device 40 includes a region of material 42 (see FIG. 3) which exhibits one or more resonant wavelengths, i.e., the material 42 exhibits an absorption coefficient, $\alpha$, greater than or equal to about $2 \times 10^4$ cm$^{-1}$ at each such wavelength. (For purposes of the invention, the resonances produced at these wavelengths are associated with one or more of a variety of material excitations, e.g., electronic excitation, vibrational excitation, etc.) In addition, the device 40 includes one (or more) sources 44 of electromagnetic radiation to provide one (or more) control beams at a resonant wavelength or wavelengths. Significantly, both the material 42 as well as the duration, intensity and resonant wavelength or wavelengths of the control beam radiation are chosen so as to only populate an energy state or states of the material 42 having decay times less than about 40 $\mu$s, or less than about 15 ps, or even as small as about 2 ps or less. (Here, the decay time of an energy state denotes the time interval over which the excited state population decays to $1/e$ of its original size.)

If the duration of the control beam radiation is longer than the decay time of an excited state of the material 42, then the excited state will necessarily be repopulated, resulting in a corresponding, nonlinear optical response having a duration equal to or longer than that of the radiation. Thus, to achieve a nonlinear optical response having a decay time, $\tau$, as short as the decay time of the excited state, the duration of the radiation should be equal to or less than the decay time of the excited state. (Here $\tau$ denotes the time interval over which the magnitude of the nonlinear optical response decreases to $1/e$ of its original value.)

By employing a cycle time (the time interval between applications of the control beam radiation) equal to (or longer than) about $2\tau$, it has been found that the resulting resonant, nonlinear optical responses within the material 42 are essentially free of any relatively slow components even at relatively high repetition rates (the frequency of application of control beam radiation, equal to the inverse of the cycle time). For example, for the materials described below, this has been found to be true for repetition rates higher than about $1.25 \times 10^4$ Hz ($\tau = 40$ $\mu$s), or higher than about $3.3 \times 10^{10}$ Hz ($\tau = 15$ ps), or even as high or higher than about $2.5 \times 10^{11}$ Hz ($\tau = 2$ps). (For purposes of the invention, a nonlinear optical response in the material 42 is essentially free of any relatively slow component, at a particular repetition rate, provided that after subjecting the initially unactivated material 42 to 100 pulses of control beam radiation at that repetition rate, the nonlinear optical response produced by the last pulse meets a specific criterion. This criterion is that the ratio of the magnitude of the response maximum (relative to a zereo defined by the unactivated material) to the magnitude of the response after a time interval (subsequent to the one-hundredth pulse) equal to the cycle time, is equal to or greater than about 10.)

Materials exhibiting the relatively short (excited state) decay times, discussed above, are readily found, in accordance with the invention, by employing a two-step procedure. The first step of this procedure is to find condensed phase materials, e.g., solid or liquid materials, having absorption spectra which include resonant wavelengths, as defined above. In this regard, the absorption spectra of many materials are to be found in a wide variety of references (see, e.g., *CRC Handbook of Chemistry and Physics*, edited by R. C. Weast (CRC Press, Inc., Boca Raton, Fla.), 60th edition, 1980), or can readily be measured using conventional techniques (regrding these techniques see, e.g., P. Laszlo and P.

Stang, *Organic Spectroscopy* (Harper & Row Publishers, N.Y.), 1971). The second step is to vary the resonant wavelength, intensity and duration of the control beam radiation until a wavelength-intensity-duration regime (or regimes) is found which yields an excited state (or states) having the desired decay time. The presence, and duration, of such excited states is readily detected using conventional techniques such as time-resolved absorption spectroscopy or time-resolved luminescence (regarding these techniques, see, e.g., "An Apparatus for Obtaining Accurate Transient Absorption Spectra on the Picosecond Time Scale," by R. B. Weisman and B. I. Greene in *Multichannel Image Detectors,* edited by Y. Talmi [American Chemical Society, Washington, D.C., 1979]).

Figure 4:
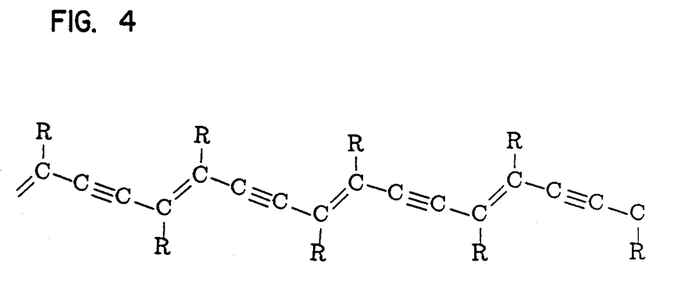
FIG. 4 depicts the structure of PDA.

Materials which exhibit resonant wavelengths are typically, although not exclusively, organic materials. As discussed, one such material is PDA. For purposes of the invention, PDA is a polymer having the structure shown in FIG. 4. Here, R denotes any one of a variety of side groups. One such side group is, for example, paratoluene sulfonate (PTS). Other useful side groups are described in "Structural Aspects of the Topochemical Polymerization of Diacetylenes," by V. Enkelmann in *Advances in Polymer Science* 63 (Springer-Verlag, Berlin, Heidelberg, 1984). Significantly, the side groups play only a minor role in defining the optical properties of PDA, typically serving only to shift the long-wavelength absorption peak of PDA, which is typically located at about 630 nm (see, e.g., FIG. 1 which is the absorption curve for PDA-PTS).

If, for example, R is PTS, then it has been found, using the procedure described above, that PDA exhibits both a relatively short-lived electronic energy state, here denoted $S_1$, and a relatively long-lived electronic triplet state, here denoted $T_1$. That is, by using 2 ps-long pulses of control beam radiation, it has been found that $S_1$ has a decay time of about 2 ps, and that it alone is populated at an excitation wavelength of, for example, 625 nm, provided the control beam intensity is equal to or less than about $4 \times 10^6$ W/cm$^2$. On the other hand, at higher intensities, it has been found that both $S_1$ and $T_1$ are populated, and that $T_1$ has a decay time of about 40 $\mu$s.

Not only does $S_1$ exhibit a relatively short decay time but, equally surprisingly, it has been found that the corresponding nonlinear optical response is much larger in magnitude than previously imagined. For example, when populating $S_1$ (using the control beam resonant wavelength, duration and intensity, discussed above), signal beam radiation, at the corresponding, resonant wavelength (of 625 nm), will see (what is considered to be) a relatively large change in refractive index from about 6.0 to about 5.95. Similarly, such signal beam radiation will also see a change in absorption coefficient from about $8 \times 10^5$ cm$^{-1}$ to about $7.96 \times 10^5$ cm$^{-1}$, which is correspondingly large.

It has been found that populating $S_1$ not only produces a relatively large change in refractive index or absorption coefficient in relation to a resonant signal beam but, quite unexpectedly, produces a relatively large change in refractive index and absorption coefficient in relation to signal beam radiation having nonresonant wavelengths. (The particular nonresonant wavelengths so affected must generally be determined empirically.)

Figure 5:
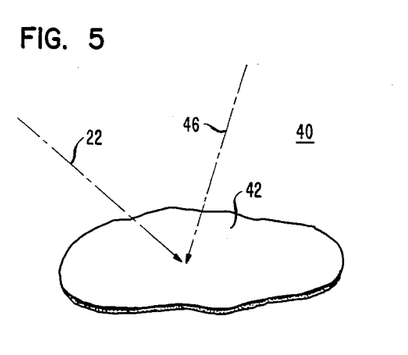

A variety of optical processing devices 40, capable of operating at relatively high repetition rates (by virtue of the relatively short decay times of the material 42), have been developed and are depicted in FIGS. 5-9. For example, the device 40 depicted in FIG. 5 is an amplitude modulator. In operation, a resonant control beam 46 (emitted by the source 44) is used to populate a relatively short-lived energy state, to produce a change in absorption. Simultaneously, a resonant or nonresonant signal beam 22 (emitted by the source 20) is impinged upon the material 42 to suffer absorption, and thus modulation, i.e., a change in intensity.

Figure 6:
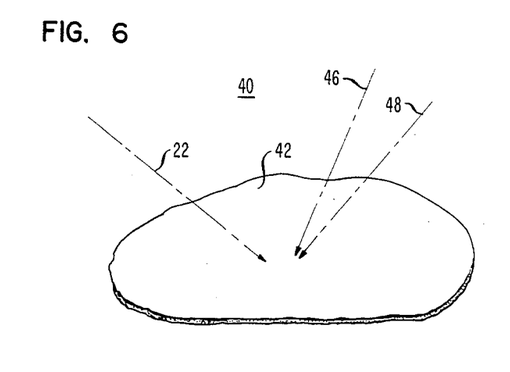

The embodiment of the device 40 depicted in FIG. 6 is useful, for example, as a demultiplexer. In operation, two resonant control beams 46 and 48 (emitted, for example, by two control beam sources) are interfered on a surface of the material 42 (in contrast to a volume region of the material 42), to produce a periodic intensity variation resulting in a periodic variation in refractive index, and thus a diffraction grating, on the surface of the material 42. Coincidentally with the formation of the diffraction grating, a resonant or nonresonant signal beam 22 is impinged upon the surface of the material 42, and reflectively diffracted from the surface of the material 42. If the signal beam radiation 22 consists of a plurality of optical pulses which have been muliplexed onto a waveguide, e.g., an optical fiber, used to communicate these pulses to the device 40, then selected pulses are readily diffracted, to achieve demultiplexing, by selectively forming the diffraction grating on the surface of the material 42. To avoid diffracting non-selected pulses, the time interval between the pulses should be greater than or equal to the decay time of the diffraction grating.

Figure 7:
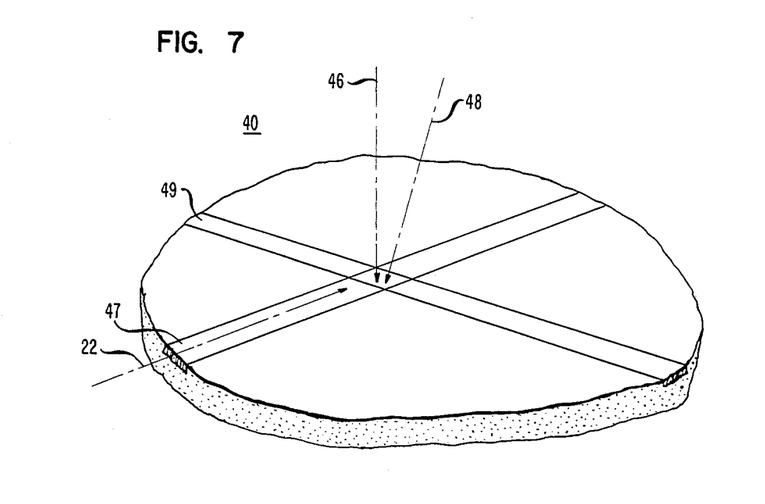

A third embodiment of the device 40 is depicted in FIG. 7 and is useful as a switch. This embodiment includes two intersecting, planar waveguides 47 and 49. Such waveguides are, for example, thin layers of PDA formed in a monomeric crystal by subjecting selected surface regions of the crystal to a beam of energy, e.g., a heat beam or a beam of electrons. (Regarding this technique for polymerizing PDA from monomeric crystals see, e.g., J. Berrehar, C. Lapersonne-Meyer and M. Schott, "Polydiacetylene Single Crystal Thin Films," *Applied Physics Letters,* Vol. 48, No. 10, 1986, pp. 630–631. In operation, two resonant control beams 46 and 48 are interfered on a surface region of the monomeric crystal common to the two planar waveguides to produce a diffraction grating. Simultaneously, a resonant or nonresonant signal beam 22 is propagated down one of the waveguides, e.g., the waveguide 47, to be diffracted (by the diffraction grating), and thus switched, into the other waveguide, e.g., the waveguide 49.

Figure 8:
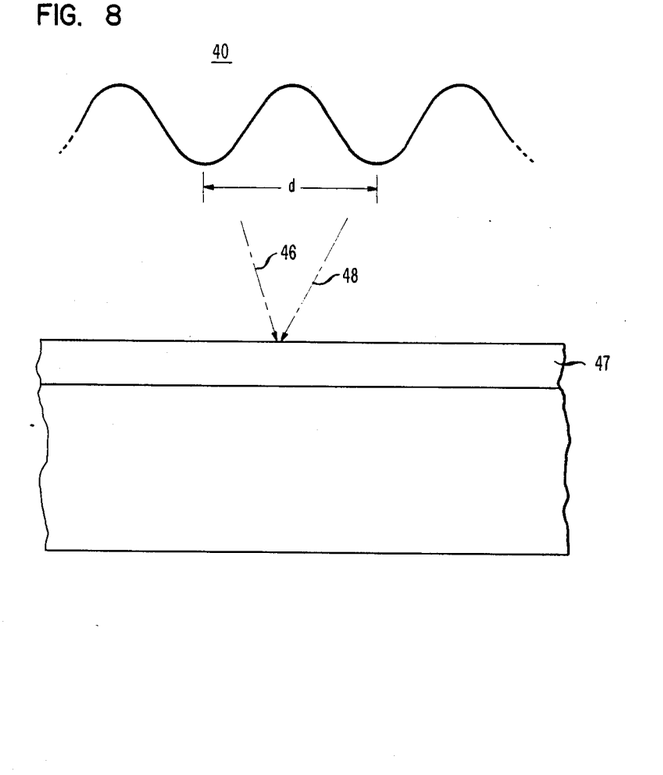

A fourth embodiment of the device 40 depicted in FIG. 8, is useful as a modulator. This embodiment includes a planar waveguide 47, e.g., a thin layer of PDA formed in a monomeric, crystalline substrate. In operation, two resonant control beams 46 and 48 are interfered on an upper surface of the waveguide 47 to produce a periodic variation in refractive index. Simultaneously, a signal beam 22 is propagated down the waveguide 47. If the distance, d, between adjacent minima in the periodic refractive index variation is equal to half the wavelength of the signal beam radiation (in the waveguide), then the periodic variation in refractive index functions as a Bragg reflector, which reflects the signal beam radiation. Thus, by forming the Bragg reflector at selected instants in time, the signal beam 22 is modulated, i.e., its intensity is selectively reduced.

Figure 9:
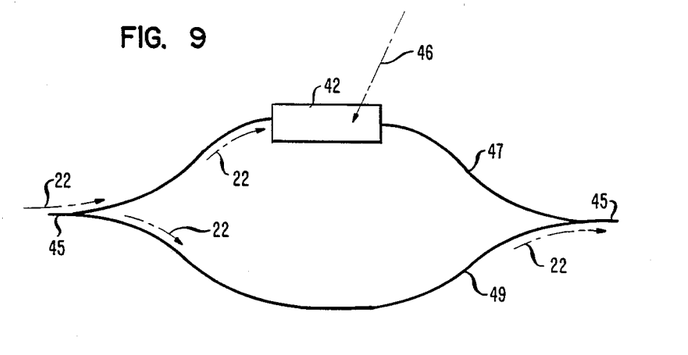

Yet a fifth embodiment of the device 40 is depicted in FIG. 9, and is also usefully employed as a modulator. This embodiment (which is a variant of the known Mach-Zender switch) includes a waveguide 45, which bifurcates into waveguides 47 and 49 which, in turn, converge to once again form the single waveguide 45. This embodiment also includes a material region 42 (exhibiting a resonant, nonlinear optical response) overlying one of the waveguides resulting from the bifurcation e.g., the waveguide 47. In operation, a signal beam 22 is propagated down the waveguide 45 (from left to right, as viewed in FIG. 9), and thus split into two signal beam portions on propagating through the waveguides 47 and 49. By impinging the material region 42 with a resonant control beam 46, a change in refractive index is produced in the material region 42, which affects the portion of the signal beam 22 propagating through the underlying waveguide 47. This change in refractive index will necessarily result in different propagation speeds for the signal beam portions in the waveguides 47 and 49, resulting in a phase difference between the two beam portions at the juncture of the waveguides 47 and 49. If the refractive index change is large enough, and is experienced over a long enough path length, then a phase difference of $\pi$ is readily produced. As a consequence, the signal beam portions will destructively interfere with one another at the juncture of the waveguides 47 and 49, with the resulting, single beam having diminished intensity. Thus, by selectively impinging the material region 42 with the control beam 46, the signal beam 22 is readily modulated.

EXAMPLE 1

An irregularly shaped sample of PDA-PTS, having length and width dimensions of about 1 centimeter (cm), and a thickness of about 2 millimeters (mm), was formed by thermally polymerizing a monomer crystal, using the technique described in J. Berrehar et al., supra. This sample included a naturally occurring facet (a surface) which contained the b axis of the crystal (i.e., the b axis was parallel to the plane defined by the facet), and had length and width dimensions of about 1 cm.

A single amplified, colliding pulse modelocked (CPM) dye laser was used to produce both the signal and control beam optical pulses impinged upon the PDA-PTS facet. The laser produced light pulses at a repetition rate of 10 Hz, of wavelength centered at 625 nm (FWHM$\approx$7 nm), of duration equal to 70 femtoseconds, and having energies of 400 microjoules per pulse. In operation, each optical pulse emitted by the laser was split (using a conventional beam splitter) into two pulses, i.e., a signal beam pulse and a control beam pulse, and one of the pulses (the signal beam pulse) was variably delayed (using a conventional optical delay line) relative to the other pulse (the control beam pulse).

The control beam pulses emitted by the laser were focused (using a conventional lens) onto the PDA-PTS facet to a spot size having a diameter of about 1 mm. Prior to being focused, each control beam pulse was variably attenuated, using conventional neutral density filters, to vary the control beam intensity. In addition, each control beam pulse was passed through a polarizer to achieve a control beam polarization parallel to the b axis of the crystal.

Each signal beam pulse was focused (using a conventional lens) into a water-containing cuvette, having a 3 cm-long optical pathlength, to achieve continuum generation. i.e., to produce a spectrally broadened laser pulse of essentially unchanged duration ($\approx$70 femtoseconds). The resulting continuum pulse was then passed through a spectral notch filter, centered (in wavelength) at 625 nm (with a FWHM of 9 nm), to select out the desired wavelengths. The spectrally filtered pulse was then passed through neutral density filters to achieve a signal beam pulse intensity less than the corresponding control beam pulse intensity. In addition, each signal beam pulse was passed through a polarizer to achieve a signal beam polarization identical to the control beam polarization. The resulting signal beam pulse was then focused (using a conventional lens) onto the facet, to the same spot as the control beam pulse.

A conventional 50/50 beam splitter was placed in the path of the signal beam to redirect a portion of the signal beam radiation away from the facet and onto a first, silicon photodiode detector. The remainder of the signal beam radiation was impinged upon the facet, reflected, and detected by a second, silicon photodiode detector.

The signals produced by the two detectors were subtracted from each other to produce a resultant signal. In the absence of the control beam pulse, there was no change in the magnitude of the resultant signal. However, when the control beam pulse was impinged upon the facet, a change in reflectivity, $\Delta R$, was produced via the resonant, nonlinear optical response, which resulted in a change in magnitude of the resultant signal.

Figure 10:
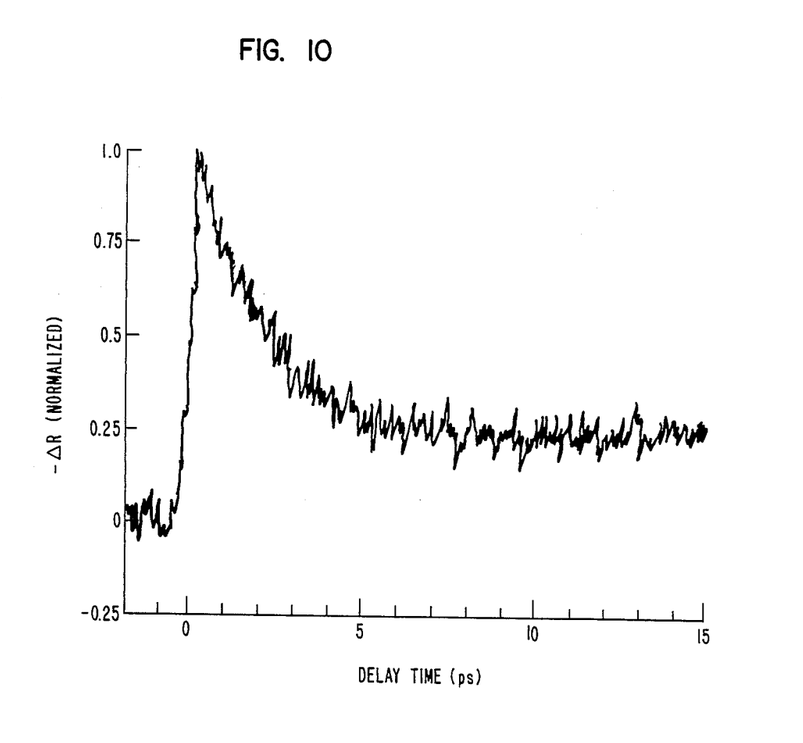
FIG. 10 depicts the nonlinear optical response induced in PDA-PTS using a single control beam pulse of wavelength equal to 625 nm, of duration equal to 70 femtoseconds, and of intensity equal to about $10^{10}$ watts/cm$^2$.

The temporal component or components of the resonant, nonlinear optical response induced in the PDA-PTS was mapped by measuring, and plotting, $\Delta R$ as a function of delay time for different delay times and different control beam pulse intensities. Such a plot is shown in FIG. 10, for the case where the control pulse intensity was equal to $10^{10}$ W/cm$^2$. Analysis of this plot indicates the existence of a first, relatively short-lived temporal component, having a decay time of about 2.0 ps, and a second, much longer-lived temporal component.

Reducing the intensity of the control beam pulse yielded a reduced (compared to the signal shown in FIG. 10) resultant signal. Significantly, the second temporal component was more reduced than the first.

EXAMPLE 2

The PDA-PTS sample, described above, was again subjected to signal and control beam pulses, with the signal beam pulses being variably delayed, as described above. However, and prior to being impinged upon the sample, each control beam pulse was split into two pulses by a conventional 50/50 beam splitter. The split control beam pulses then traversed paths of identical length prior to being recombined, via mirrors, at the surface of the facet. These recombined pulses, which met at an angle of about 16 degrees, interfered with each other at the facet surface to produce a periodic intensity pattern which, via the resonant nonlinear optical response, served to reflectively diffract the portion of the signal beam pulse incident on the facet.

Figure 11:
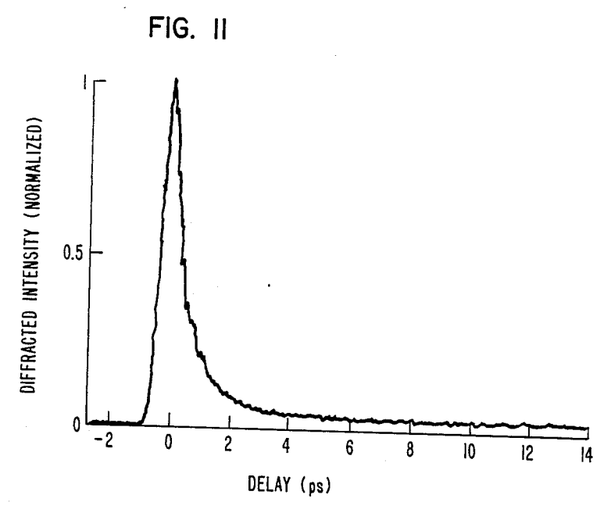
FIGS. 11-12 depict the resonant nonlinear optical responses induced in PDA-PTS using control beam pulses having identical wavelengths and durations but different intensities.
Figure 12:
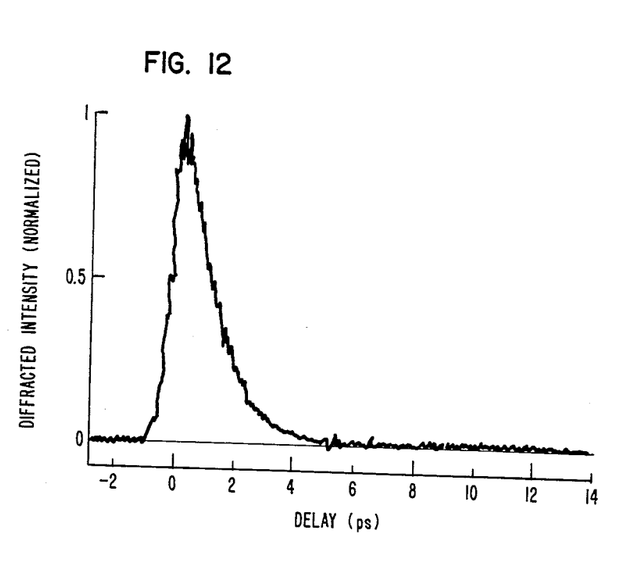

Rather than subtracting the signals produced by the two detectors from each other, the two signals were ratioed (the ratio of the detector signal produced by the diffracted portion of the signal beam pulse to the detector signal produced by the redirected portion of the signal beam pulse) to produce a resultant signal. One such resultant signal, for the case where the interfering control beam pulses had intensities of $6 \times 10^9$ W/cm$^2$, is shown in FIG. 11. Analysis indicates that this resultant signal includes both the relatively short-lived and long-lived temporal components, discussed above. Reducing the intensities of the interfering control beam pulses to $6 \times 10^8$ W/cm$^2$ yielded the resultant signal shown in FIG. 12. Here, analysis indicates that essentially only the relatively short-lived temporal component is present.

What is claimed is:

1. An optical system, comprising:

at least a first source of electromagnetic radiation;

means, in optical communication with said first source, for processing the electromagnetic radiation emitted by said first source; and a detector of electromagnetic radiation, in optical communication with said means, characterized in that said means includes a material region essentially free of inorganic semiconductor material, exhibiting a nonlinear optical response at one or more resonant wavelengths of electromagnetic radiation, and at least a second source of electromagnetic radiation in optical communication with said material region, the wavelength, duration and intensity of the electromagnetic radiation emitted by said second source, and impinging upon said material region, being chosen to achieve a resonant, nonlinear optical response, essentially free of any relatively slow component, in said material region, at a repetition rate greater than about $1.25 \times 10^4$ Hz.

2. The optical system of claim 1 wherein said means includes an amplitude modulator.

3. The optical system of claim 1 wherein said means includes a demultiplexer.

4. The optical system of claim 1 wherein said means includes a switch.

5. The optical system of claim 1 wherein said material region includes organic material.

6. The optical system of claim 5 wherein said organic material includes polydiacetylene.

7. An optical system, comprising:

at least a first source of electromagnetic radiation;

means, in optical communication with said first source, for processing the electromagnetic radiation emitted by said first source; and a detector of electromagnetic radiation, in optical communication with said means, characterized in that said means includes a material region exhibiting a nonlinear optical response at one or more resonant wavelengths of electromagnetic radiation, and at least a second source of electromagnetic radiation in optical communication with said material region, the wavelength, duration and intensity of the electromagnetic radiation emitted by said second source, and impinging upon said material region, being chosen to achieve a resonant nonlinear optical response, essentially free of any relatively low component, in said material region, at a repetition rate greater than about $3.3 \times 10^{10}$ Hz.

* * * * *